United States Patent Office.

OSCAR SCIDMORE, OF ALBANY, NEW YORK.

Letters Patent No. 90,962, dated June 8, 1869.

IMPROVED MEDICAL COMPOUND.

The Schedule referred to in these Letters Patent and making part of the same.

*To all whom it may concern:*

Be it known that I, OSCAR SCIDMORE, of the city and county of Albany, and State of New York, have invented or discovered a new and useful Medical Compound for pulmonary and other diseases to which the human system is liable; and I do hereby declare that the following is a full, clear, and exact description thereof.

The nature of this compound is such as tends to affect beneficially the several organs where disease is apt to locate in persons tending to pulmonary complaints, or when attacked by severe colds.

It is well known that in all pulmonary diseases and colds, the bowels should be kept loose or free, the lungs should be soothed and healed, and the liver and kidneys should be strengthened, so as to perform their functions in a healthy manner; and as no material or substance can be taken into the system without affecting some part of the organism of the body, either for good or evil, it is necessary, in a good and truly beneficial and healing remedy, for such complaints as named, that the materials or substances used should not, either singly or when compounded, exert a pernicious result, directly or indirectly, on any of the vital or other organs of the body, but should tend to strengthen, soothe, heal, and contribute to the general health of the whole body.

In my invention, I have sought to bring together and properly compound several substances which are known to be beneficial to some part of the human system, especially to those organs which are generally affected when pulmonary diseases attack a person.

One ingredient or substance in this compound is licorice-root. This root acts as a pleasant demulcent and safe expectorant, and exerts considerable beneficial effect upon the mucous membrane of the lungs.

Another substance is flax-seed, which is well known to allay irritation, and exerts a soothing effect on inflamed portions of the lungs.

Another substance used is honey, which is opening to the bowels, and promotes the secretion of phlegm or mucus in coughing.

Another substance is tar. This tar warms the blood, promotes urine, animates the feelings, and invigorates the digestive powers.

Another substance is loaf-sugar, which, while it is healing to the lungs, also makes the compound agreeable.

Spirits are also used, to preserve the compound from souring.

To enable others skilled in the art to make and use this compound, I will proceed to describe the proportions used of the several ingredients named, and the manner of compounding the same.

The portions used for one quart are as follows, to wit:

Four (4) ounces of licorice-root.
One (1) tablespoonful of flax-seed.
One-half ($\frac{1}{2}$) pound of honey.
One-half ($\frac{1}{2}$) pound loaf-sugar.
One (1) teaspoonful tar.
One (1) pint rum.

I first steep the licorice-root and the flax-seed in one-half ($\frac{1}{2}$) pint of boiling water, for twenty-five or thirty minutes. I then add the honey, and sugar, and rum in proportions named, and steep the whole fifteen minutes. I then add to the whole the tar in its proportion, and boil the mass for ten minutes. The liquid is then strained off, and suffered to cool. When cool, the scum, which will rise to the top, is taken off, and the liquid is bottled and tightly corked.

The usual dose is one tablespoonful, taken three or four times a day, before eating and retiring to bed.

Having described my invention,

What I claim, and desire to secure by Letters Patent, is—

The composition above described, compounded of the several medicinal substances named, and in the proportions specified, substantially in the manner set forth for the purpose specified.

OSCAR SCIDMORE.

Witnesses:
ISAAC C. GROOM,
ALEX. SELKIRK.